Oct. 3, 1961　　　M. H. GROVE　　　3,002,525
VALVE CONSTRUCTION
Filed Oct. 9, 1959　　　　　　　　　　4 Sheets-Sheet 2
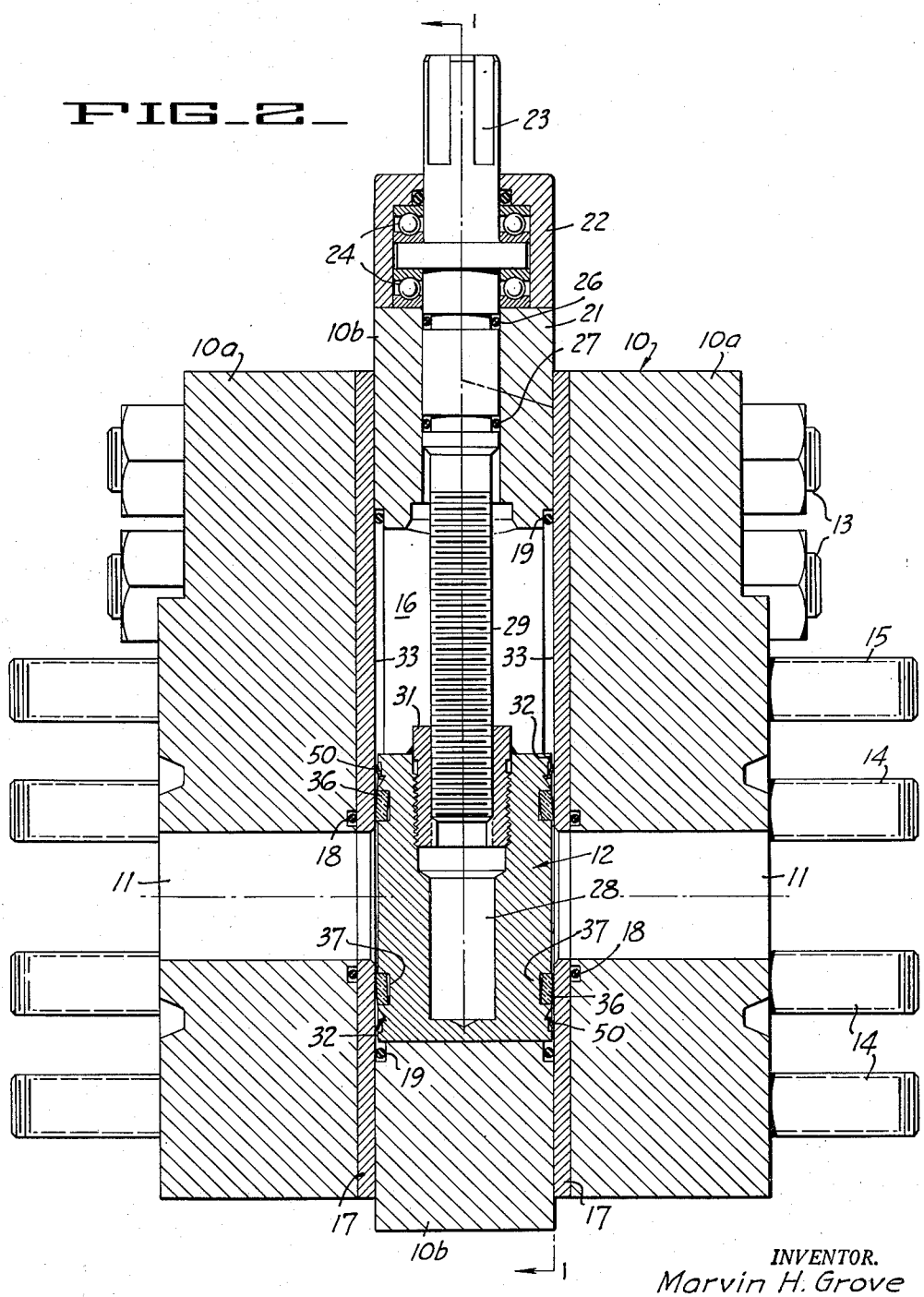
INVENTOR.
Marvin H. Grove
BY
*Flehr & Swain*
ATTORNEYS

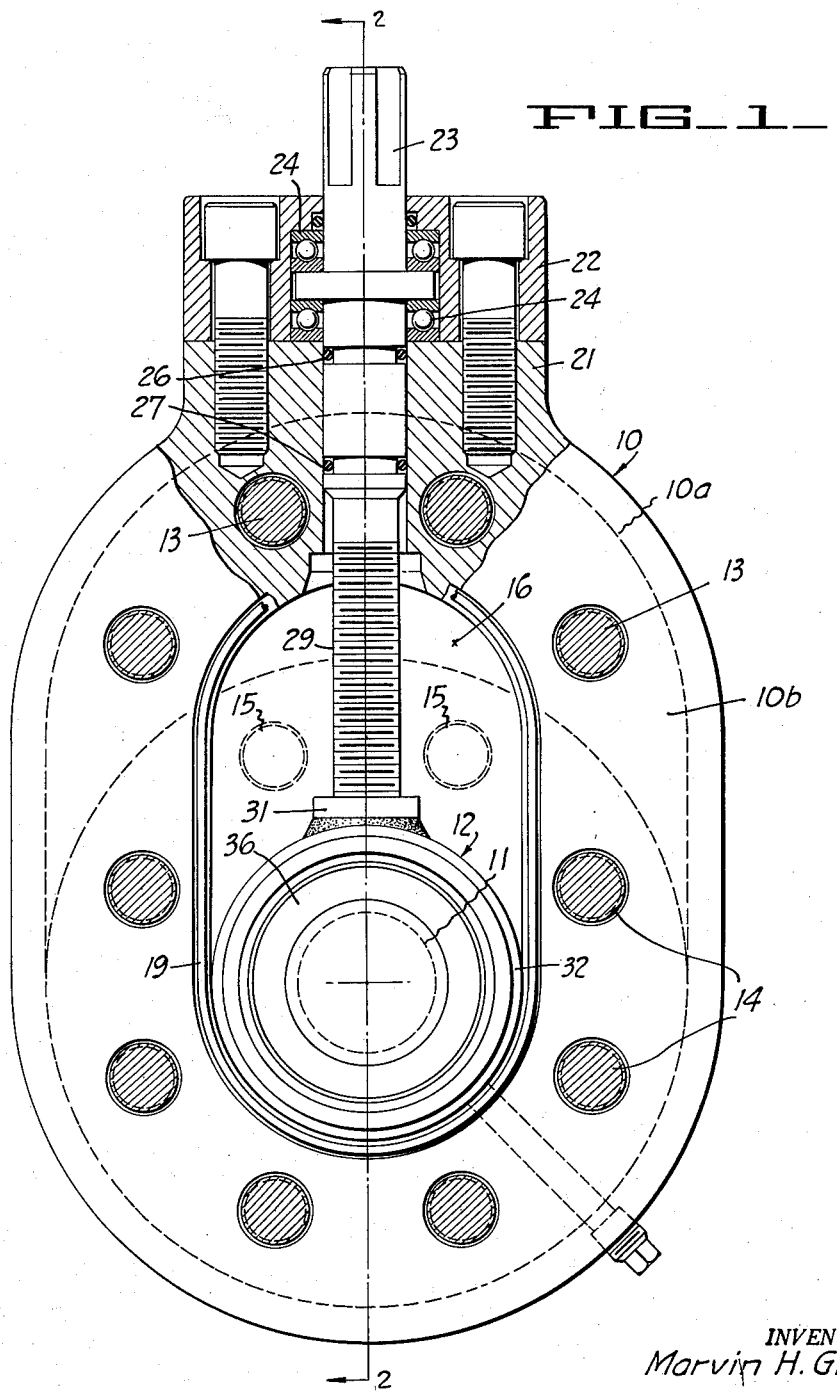
FIG_1_
INVENTOR.
Marvin H. Grove
ATTORNEYS

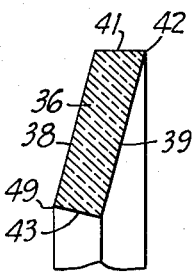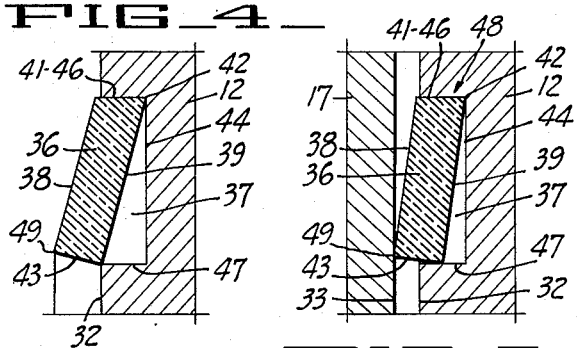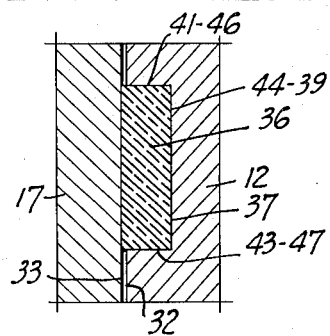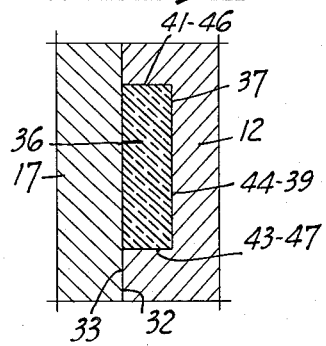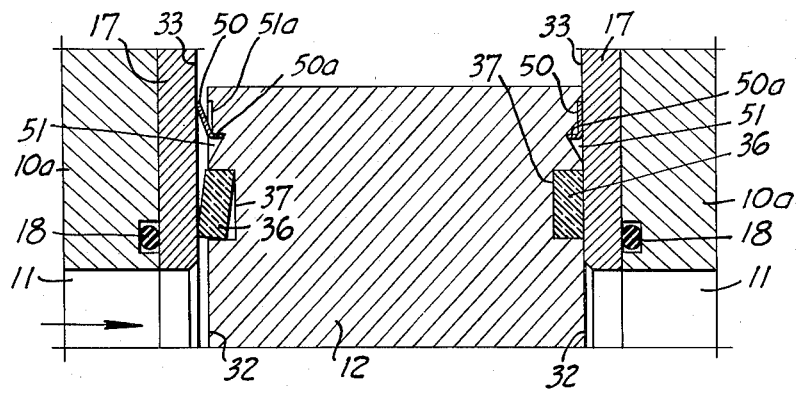

Oct. 3, 1961  M. H. GROVE  3,002,525
VALVE CONSTRUCTION
Filed Oct. 9, 1959  4 Sheets-Sheet 4
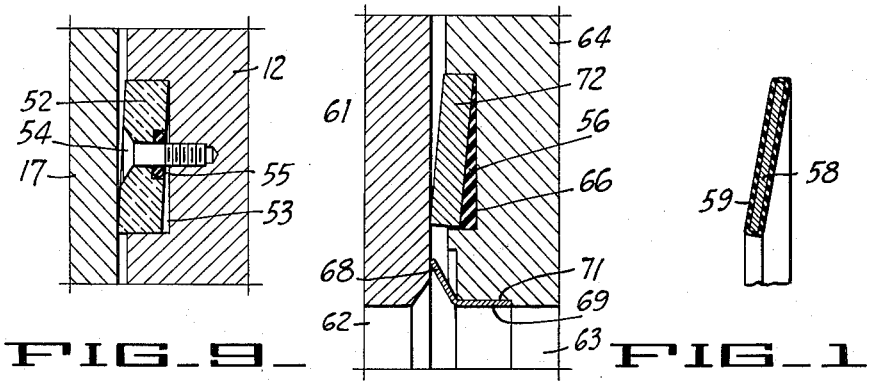
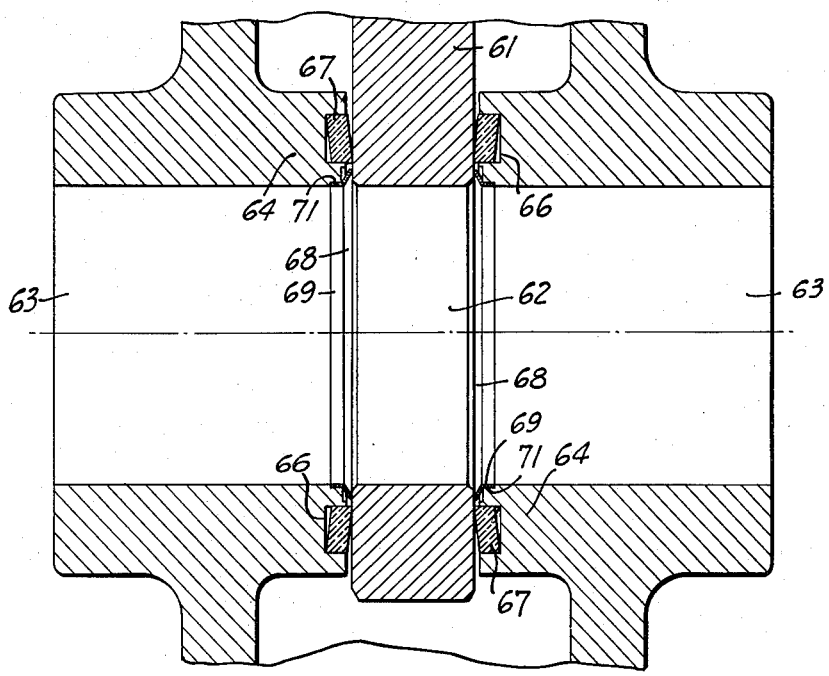
INVENTOR.
Marvin H. Grove
BY
ATTORNEYS

# United States Patent Office 3,002,525
Patented Oct. 3, 1961

3,002,525
VALVE CONSTRUCTION
Marvin Henry Grove, 340 Hillside Ave., Piedmont, Calif.
Filed Oct. 9, 1959, Ser. No. 845,342
11 Claims. (Cl. 137—242)

This invention relates generally to valves in which a valve member moves between open and closed positions relative to flow passages in the body. In the form disclosed herein the valve is of the gate type.

Various means have been employed with gate valves for forming fluid tight seals between the sides of the valve gate and seating means carried by the body. In some instances metal-to-metal valve working surfaces are provided, with wedging gates to provide relatively high mechanical forces for pressing the valve working surfaces together. In other instances so-called soft seats are employed, such as seal rings formed of synthetic rubber or like resilient material carried within recesses formed in either the body or the gate. For example in one successful commercial gate valve (see Bryant 2,810,543) the seal rings employed are of the O-ring type, and are mounted in such a manner as to prevent dislodgment during operation of the valve between open and closed positions. Seal rings of the resilient O-ring type have a number of advantages over the use of resilient inserts. However the means employed for carrying such resilient O-rings upon either the body or the gate, require certain machined parts which add materially to the overall cost of the valve. Furthermore it is generally desirable to incorporate mechanical spring means in addition to the resilient seal rings, to insure maintenance of sealing contact under all operating conditions.

In general it is an object of the present invention to provide simplified means for forming effective seals in valves including valves of the gate type.

Another object of the invention is to provide gate valve sealing means of the above character which will tolerate a limited lateral movement of the gate.

Another object of the invention is to provide a gate valve having novel sealing means which will avoid the necessity of supplemental springs, and which will require only a simple recess in either the body or gate parts for carrying the same.

Another object of the invention is to provide a gate valve having sealing means which acts differently under different operating conditions. For example, when pressure differential is applied to the valve, on the downstream side the sealing means presents a flat sealing area for cooperating with an adjacent valve working surface, while on the upstream side, sealing is established on areas of different effective diameters, thereby providing a fluid pressure area.

Another object of the invention is to provide a valve of the above character having sealing means such that by a change in material, the valve can be constructed for a wide variety of services, including high and low temperature services, as well as the intermediate temperatures where certain known types of non-metallic resilient material can be employed.

Another object of the invention is to provide a gate valve with wiping or scraping means, in addition to the sealing means, whereby the cooperating valve working surfaces are maintained relatively free of foreign material.

Additional objects and features of the invention will appear from the following description in which the preferred embodiments have been set forth in detail in conjunction with the accompanying drawing.

Referring to the drawing:
FIGURE 1 is a side elevational view in section illustrating a valve incorporating the present invention.
FIGURE 2 is a cross-sectional view taken along the line 2—2 of FIGURE 1.
FIGURE 3 is a detail in section illustrating one of the seal rings incorporated in my valve.
FIGURE 4 is an enlarged detail in section illustrating the ring of FIGURE 3 carried by the gate.
FIGURE 5 is a view like FIGURE 4 but showing the gate inserted in the valve body, with the seal ring being partially compressed.
FIGURE 6 is a view like FIGURE 5 but showing the seal ring completely compressed by fluid pressure acting upon the gate.
FIGURE 7 is a view like FIGURE 6 but showing the application of a higher fluid pressure sufficient to squeeze the seal ring completely within its accommodating recess.
FIGURE 8 is a detail in section illustrating both upstream and downstream seals, and assuming the application of pressure differential.
FIGURE 9 is a detail in section like FIGURE 5, but illustrating another embodiment.
FIGURE 10 is a detail in section like FIGURE 5, but showing another embodiment employing supplemental yieldable means.
FIGURE 11 is a detail in section illustrating an embodiment in which a metal ring is coated with a non-metallic plastic or other resilient material.
FIGURE 12 illlustrates another embodiment in which the seal rings are carried by the body.

The valve illustrated in FIGURES 1 and 2 consists generally of a body 10 which is provided with the aligned flow passages 11. Within the body there is a valve member in the form of a gate 12 which is movable between open and closed positions relative to the flow passages.

While the body may be made integral, as for example a steel casting suitably machined, in this instance it is formed of a plurality of parts, including the outer plate-like parts 10a, and the intermediate part 10b. The body parts or sections are clamped together by suitable means such as the bolts 13, the bolt studs 14 and the studs 15. The projecting ends of the studs 14 and 15 serve as means for attaching the valve to the flanges of associated piping.

The body parts may have a generally oval configuration as shown in FIGURE 1. The intermediate part 10b is cut away to provide the inner body space 16, which accommodates the gate 12.

While the inner faces of the body parts 10a may form valve working surfaces, it is desirable to provide liners 17 for this purpose. These liners are shaped to substantially the same outer configuration as the body parts, and they are provided with openings registering with the flow passages 11.

Sealing means 18, as for example means of the resilient O-ring type, is interposed between each outer body part 10a, and its associated liner 17. Also sealing means 19 which likewise can be of the resilient O-ring type is interposed between the intermediate body part 10b, and the liner 17. The liners can be formed of a suitable metal or metal alloy, such as one of the stainless steels, Monel metal, Hastelloy, bronze or the like.

The intermediate body part 10b is provided with an extension 21 which serves to mount the bonnet plate 22. An operating stem 23 extends through the bonnet plate, and is provided with suitable journal or bearing means 24. Suitable sealing means is provided for preventing leakage by the stem, such as the seal rings 26 and 27 of the O-ring type. Operating means, such as a hand wheel, gearing, or the like (not shown), connects with stem 23.

The valve gate 12 is provided with a bore 28 to accommodate the threaded end 29 of the valve stem. Instead of directly threading the gate, a threaded bushing 31 can be attached to the gate for engaging the threaded stem portion 29.

The gate is machined, as by grinding, to provide side parallel faces 32 which are parallel and which cooperate with the valve working surfaces 33, provided by the surfaces of the liner 17. The fitting of the gate between the liners is such that the gate is free to move between open and closed positions, but does not have excessive mechanical clearance.

The sealing means for the valve described above consists of seal rings 36 which are carried within recesses 37 on opposite sides of the valve gate. The construction of such seal rings, and the manner in which they operate, can be better understood from FIGURES 3–8 inclusive. As shown in FIGURE 3, each ring 36 can be in the form of a Belleville washer. As viewed in section, the side surfaces 38 and 39 can be substantially parallel, and it is desirable for the outer periphery 41 to conform substantially to a cylindrical surface having its axis coincident with the axis of the ring. This provides a corner 42 which in section is formed as an acute angle. The inner periphery 43 may likewise conform to a cylindrical surface, having its axis coincident with the axis of the ring, or if desired, this surface may be rounded or may be perpendicular (as viewed in section) with the surfaces 38 and 39 as illustrated.

Each recess 37 can be formed with a simple rectangular configuration such as illustrated in FIGURES 4 and 5. In this instance, the surface 44 which defines the bottom of the recess, is parallel to the side surface 32 of the gate. The surface 46 defines the outer periphery of the recess and conforms to a cylinder. The inner surface 47, defining the inner periphery of the recess, likewise conforms to a cylinder.

The dimensions of the ring relative to the dimensions of the recess, are important for proper action. The outer diameter of each ring 36 conforms substantially to the diameter of the recess surface 46, whereby when the gate is removed from the body and the rings 36 are relaxed, they slip snugly within the recesses in the manner illustrated in FIGURE 4. When the gate with the rings applied is inserted into the valve body between the body valve working surfaces 33, each of the rings 36 is partly compressed or sprung and the gate takes a position intermediate the body surfaces 33. The inner margin of each ring 36 under such conditions is partly within the recess 37, substantially as shown in FIGURE 5.

The compression of the seal ring 36 upon insertion in the body, causes mechanical pressure on the outer corner 42, since this corner tends to increase its diameter. Such compression develops substantial forces between the peripheral surfaces of the ring in the region of this corner, and the corresponding corner of the recess 37. In other words, the outer periphery of the ring 36 adjacent the corner 42, is pressed tightly against the corresponding area of the recess surface 46. This serves to establish a fluid tight seal in the region 47 indicated in FIGURE 5. At the same time the inner corner 48 of the ring is yieldably urged against the body valve working surface 33, thus establishing a fluid tight seal in this annular area of contact.

Each seal is also dimensioned whereby it is slightly thicker (in section) than the depth of its associated recess.

The material from which the rings 36 are made is dependent upon such factors as the operating pressures, the size of the valve, and the surface for which the valve is designed. Good results have been secured by the use of a non-metallic resilient material, and particularly a plastic or elastomer like nylon. Such material has sufficient strength for the required spring-like action, and is not subject to cold flow. Furthermore it is resistant to a wide variety of fluids and chemicals.

Assuming that the seal rings 36 are made of a material like nylon, operation of the valve is as follows: Without fluid pressure differential being applied to the valve, the positioning of the gate and the seal rings 36 is substantially shown in FIGURE 2. Thus the gate assumes an intermediate position, with a small amount of clearance between its sides and the valve working surfaces 33. When both of the seal rings 36 are partially compressed, each ring forms seals in the areas indicated in FIGURE 5. It will be noted that these sealing areas are on different diameters. Assuming the application of a fluid pressure differential, the gate moves toward the downstream side, thus causing greater compression of the downstream sealing ring 36 and permitting some relaxation of the upstream ring. A relatively small fluid pressure differential will suffice to completely flatten the downstream seal ring in the manner illustrated in FIGURE 6. When the downstream seal ring is completely flattened in the manner shown in FIGURE 6, pressure is applied directly through the body of the ring, or in other words, all of the thrust of the gate is taken by compression of the ring. Under such conditions, there is a small clearance between the surfaces 32 and 33 (FIGURE 6) and relatively extended annular sealing areas are established, one being between the body seating surface 33 and the corresponding face of the ring 36, and the other being between the inner face of the ring and the bottom recess surface 44. As the pressure is increased to or near the maximum value for which the valve is designed, the ring 36 on the downstream side may be compressed to the extent shown in FIGURE 7 whereby the surfaces 32 and 33 are brought into direct contact. This limits further compression of the downstream seal ring, thus preventing mechanical injury.

Upon the upstream side of the gate, sealing ring 36 presents a fluid pressure area, due to the different diameters upon which seals are established, as shown in FIGURE 5. As a result, pressure differential between the upstream flow passage and the body, tends to urge the upstream seal ring 36 against the seating surface 33. The seal on the upstream side between the seal ring and the gate is maintained on the outer diameter of the seal ring, and therefore any movement of the seal ring away from the bottom of the recess does not break the seal.

It will be evident from the foregoing that my novel valve construction establishes seals upon both the upstream and downstream sides of the gate. On the upstream side fluid pressure differential tends to urge the upstream seal ring 36 against the body seating surface 33. On the downstream side the seal ring is directly compressed and establishes sealing contact over substantially its entire area.

It has been found that a valve constructed as described above is capable of being opened and closed under application of relatively high line pressures, without causing seal ring dislodgment.

As illustrated particularly in FIGURES 2 and 8, the valve described above preferably incorporates scraping or wiping means for the removal of foreign material from valve working surfaces contacted by the seal rings. Referring particularly to FIGURE 8, this means consists of rings 50 formed of spring metal such as one of the stainless steels, Monel metal, bronze or the like. These rings are retained upon the side faces of the gate in regions generally embracing the seal rings. Thus each ring 50 is shown provided with a flange portion 50a which is adapted to be accommodated in an annular recess 51. The main portion of each ring 50 is dished to act as a Belleville washer, and the adjacent face of the gate is provided with an annular accommodating recess 51a which in effect is an extension of the recess 51. On the downstream side of the gate, corresponding to the right hand side of FIGURE 8, the thrust of the gate serves to flatten the ring 50 within the recess 51a. On the upstream side the outer peripheral edge of the ring 50 remains in contact with the upstream valve working surface 33. When the gate is moved between open and closed positions it will be evident that the rings 50 apply a scraping or wiping action to the valve working surface 33, thus serving to remove any accumulation of foreign material from the valve working surfaces whereby the surfaces engaged by the seal rings are relatively free of foreign material to promote good sealing engagement.

FIGURE 9 illustrates another embodiment of the invention in which supplemental means is employed to retain the seal rings upon the gate. Thus in this instance the seal rings 52 are formed substantially in the same manner as previously described, and are similarly fitted within the recesses 53 provided in the valve gate. Circumferentially spaced screws 54 extend through the ring 52, and serve as positive means for attaching the seal 52. Leakage between the shanks of screws 54 and the ring 52, can be prevented by suitable sealing means 55 such as sealing means of the resilient O-ring type.

It is possible to use seal rings formed of suitable metal or metal alloy, instead of a non-metallic elastic material. For example, the rings can be made of such materials as stainless steel, Monel, bronze or the like. The positioning of such seal rings within the accommodating recess can be substantially as previously described. Likewise, the proportioning can be such that on the downstream side the thrust of the gate is taken entirely by the compressed ring. It will be evident that a valve using metal seal rings is capable of high temperature uses, and for various services where rubbers, elastomers, plastics, or other synthetic materials are not suitable.

As shown in FIGURE 11, the ring 58 may be formed with a spring metal core provided with an outer coating 59 of elastic non-metallic material, such as Teflon or the like. Such a coating can be applied by various known techniques.

As shown in FIGURE 12, the seal rings can be mounted upon portions of the body, instead of on the gate. Thus, in this case, the flat gate 61 is provided with a port 62 which registers with the flow passages 63 in the body for open position. The inner portions 64 of the body hubs are provided with recesses 66, for accommodating the seal rings 67. Here again the seal rings are dimensioned and fitted within the recesses, to obtain the same principle of operation as previously described.

FIGURE 12 also incorporates wiping or scraping means performing the same function as the scraper rings 50. Thus the scraper rings 68 are provided and arranged to engage the gate in regions inwardly of the seal ring 67. Rings 68 are likewise formed of spring metal, and include flanges 69 which interfit recesses 71 formed in the body.

FIGURE 10 shows an embodiment in which supplemental means is provided for yieldably urging the seal rings against the associated valve working surface. Thus seal ring 72 in this instance is similar to the seal ring 67 of FIGURE 12. However, instead of employing a simple ring, a layer 56 of resilient material is bonded to the rear side of the ring and is fitted within the accommodating recess 66. The material from which layer 56 is made can have relatively good elasticity and recovery compared to the material from which ring 72 is made. For example, assuming that ring 72 is made of Teflon or nylon, layer 56 can be made of synthetic rubber having relatively good elasticity and recovery compared to nylon or Teflon. Preferably the layer 56 is tapered as viewed in section whereby it does not provide any give at the outer periphery of the seal ring. It will be evident that the construction shown in FIGURE 10 can be used for the embodiments in which the seal rings are carried by the gate, as well as for the embodiment of FIGURE 12 where the seal rings are carried by the body.

In view of the foregoing, it is evident that I have provided a relatively simple type of valve in which the sealing means and provision for its mounting are relatively simple. The invention can be utilized with a relatively wide variety of materials, thus making it possible to adapt the invention to a wide variety of services.

I claim:

1. In a valve construction, a body member having aligned flow passages, a valve member disposed within the body and movable between open and closed positions relative to the passages, portions of the body having valve seating surfaces surrounding the passages and disposed adjacent the side surfaces of the valve member, annular seal rings on opposite sides of the valve member and forming seals between said surfaces for closed position of the valve, each seal ring being formed like a Belleville washer, said member having annular recesses to accommodate said rings, both said rings being sprung whereby annular areas on opposite sides of the same are urged into sealing engagement with the surfaces of both the body and the valve member.

2. A valve as in claim 1 in which the seal rings are formed of a non-metallic elastic material.

3. A valve as in claim 1 in which the seal rings are formed of metal.

4. A valve as in claim 1 in which the seal rings are formed of spring metal coated with a non-metallic elastic material.

5. In a valve construction, a body member having aligned flow passages, a gate member disposed within the body and movable between open and closed positions relative to the passages, portions of the body having valve seating surfaces surrounding the passages and disposed adjacent the side surfaces of the gate, annular seal rings disposed adjacent opposite sides of the gate and forming seals between said surfaces, each seal ring being a member formed like a Belleville washer, one of said members having annular recesses to accommodate said rings, said recesses and seal rings being dimensioned to cause an outer peripheral corner of each seal ring to press and seal against the adjacent surface that defines the outer periphery of the associated recess, both said rings being normally sprung whereby annular areas on opposite sides of the same are urged into sealing engagement with surfaces of the body and gate members.

6. A valve as in claim 5 in which the pressure between each seal ring and the surface forming the outer periphery of the associated recess, increases with increased compression of the seal ring.

7. In a valve construction, a body member having aligned flow passages, a valve member disposed within the body and movable between open and closed positions relative to the passages, portions of the body having valve seating surfaces surrounding the passages and disposed adjacent the side surfaces of the valve member, annular seal rings adjacent opposite sides of the valve member and forming seals between said surfaces and the valve member for closed position of the valve, each seal ring being a member formed like a Belleville washer and one section having a configuration with a minor dimension in the direction of the axis of the ring and a major dimension in the direction of the radius of the ring, one of said members having annular recesses to accommodate said rings, both said rings being sprung whereby annular areas of the same located diagonally on said configuration are urged into sealing engagement with surfaces of both the body and the valve member, each seal ring being dimensioned to have the thickness of said configuration greater than the depth of the associated recesses, whereby the seal ring on the downstream side of the valve member is compressed by the thrust of the valve member when fluid pressure differential is applied to overcome the spring of the downstream rings.

8. A valve as in claim 7 in which said recesses and said seal rings are dimensioned to cause an outer peripheral corner of each seal ring to press and seal against an adjacent surface that defines the outer periphery of the associated recess.

9. In a valve construction, a body member having aligned flow passages, a gate disposed within the body and movable between open and closed positions relative to the passages, annular sealing means interposed between the sides of the gate and the body for closed position of the gate and serving to form fluid tight seals between the gate and the body, and annular wiping or scraper means interposed between the body and the gate, each wiping means being concentric with an associated sealing means.

10. A valve as in claim 9 in which the scraping means is in the form of spring sheet metal rings carried by one of said members and having continuous scraping edges engaging the valve working surfaces provided by the other member.

11. In a valve construction, a body member having applied flow passages, a plate-like gate member disposed within the body and movable between open and closed positions relative to the passages, portions of the body having valve working surfaces surrounding the passages and disposed adjacent the side surfaces of the gate, annular seal rings of a resilient material carried on opposite sides of the gate and forming seals between said surfaces and the gate for closed position of the valve, and additional scraping means carried by the sides of the gate, said scraping means comprising rings formed of spring sheet metal having continuous outer peripheral edges adapted to engage and scrape on the valve working surfaces in areas generally surrounding said seal rings.

References Cited in the file of this patent

UNITED STATES PATENTS

| 1,869,741 | DuBois | Aug. 2, 1932 |
| 2,341,018 | Clapp | Feb. 8, 1944 |
| 2,762,601 | Clade | Sept. 11, 1956 |

FOREIGN PATENTS

| 1,101,193 | France | Apr. 20, 1955 |